(12) United States Patent
Kastein et al.

(10) Patent No.: US 7,613,856 B2
(45) Date of Patent: Nov. 3, 2009

(54) ARBITRATING ACCESS FOR A PLURALITY OF DATA CHANNEL INPUTS WITH DIFFERENT CHARACTERISTICS

(75) Inventors: Kurt Jay Kastein, Fort Collins, CO (US); Jackson Lloyd Ellis, Fort Collins, CO (US); Eskild Thormod Arntzen, Cheyenne, WY (US)

(73) Assignee: LSI Corporation, Milpitas, CA (US)

( * ) Notice: Subject to any disclaimer, the term of this patent is extended or adjusted under 35 U.S.C. 154(b) by 738 days.

(21) Appl. No.: 10/970,211

(22) Filed: Oct. 21, 2004

(65) Prior Publication Data

US 2006/0088049 A1 Apr. 27, 2006

(51) Int. Cl.
*G06F 13/12* (2006.01)
*G06F 13/38* (2006.01)
*H04L 12/43* (2006.01)
*H04J 3/02* (2006.01)

(52) U.S. Cl. .................... 710/74; 370/461; 370/462
(58) Field of Classification Search .............. 710/74
See application file for complete search history.

(56) References Cited

U.S. PATENT DOCUMENTS 5,913,045 A * 6/1999 Gillespie et al. ............ 710/311
6,584,531 B1 * 6/2003 Singh .......................... 710/244
2004/0006659 A1 * 1/2004 Lee .............................. 710/107
2005/0223131 A1 * 10/2005 Goekjian et al. .............. 710/22

OTHER PUBLICATIONS

Dave Pahl, Maximizing Data Transfer Efficiency with C5000 DMA Controller, Sep. 12, 2001 ,Texas Instuments, pp. 1- 58.*

* cited by examiner

*Primary Examiner*—Niketa I Patel
*Assistant Examiner*—Brooke J Dews
(74) *Attorney, Agent, or Firm*—Yee & Associates, P.C.

(57) ABSTRACT

A configurable buffer arbiter is provided that combines a time-slot based algorithm, a fairness-based algorithm, and a priority-based algorithm to meet the bandwidth and latency requirements of multiple channels needing access to a buffer memory. The channels have different static and dynamic characteristics. The static channel characteristics include aspects such as a required latency for access to the buffer memory, a required bandwidth to the buffer memory, a preferred latency or bandwidth to the buffer memory, the amount of data the channel can burst in each access to the buffer memory, and the ability for the channel to continuously burst its data to the buffer memory with or without any pauses. The dynamic characteristics include aspects such as whether a channel's FIFO is nearing full or empty, or whether one of the static characteristics has suddenly become more critical. Configuration of the arbiter algorithms exists to optimize the arbiter for both the static and dynamic channel characteristics.

13 Claims, 4 Drawing Sheets

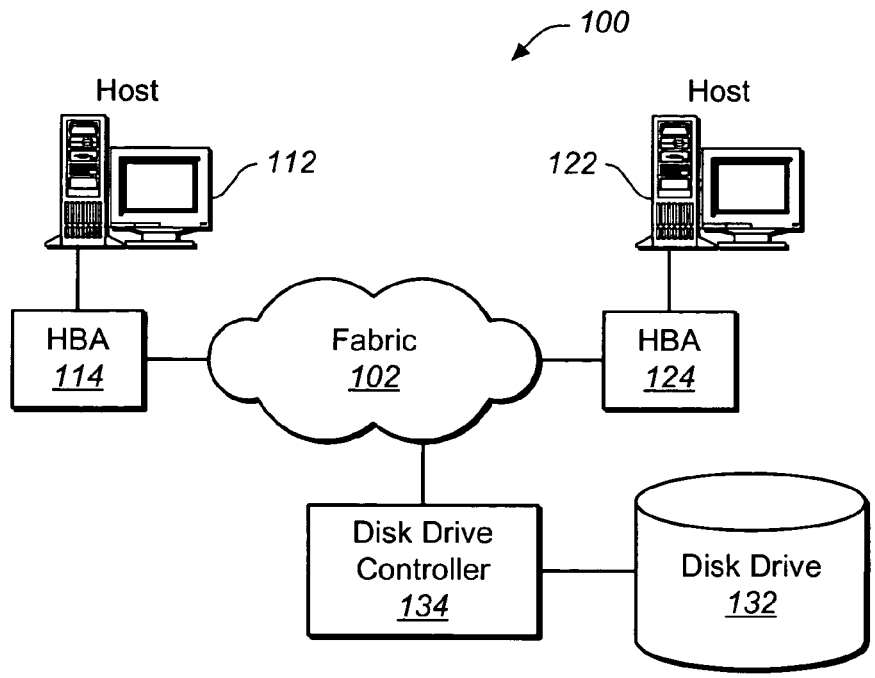
FIG._1
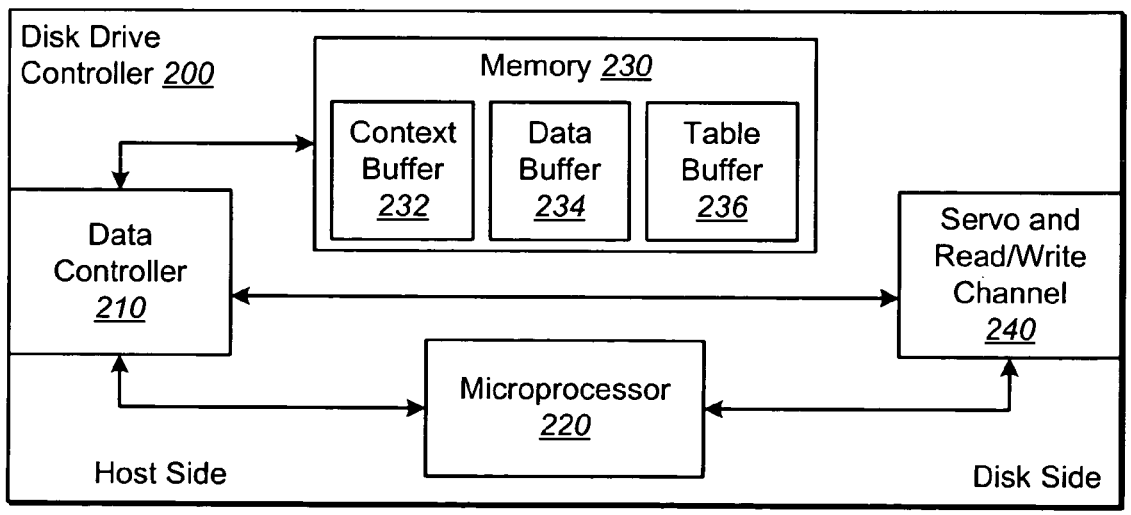
FIG._2

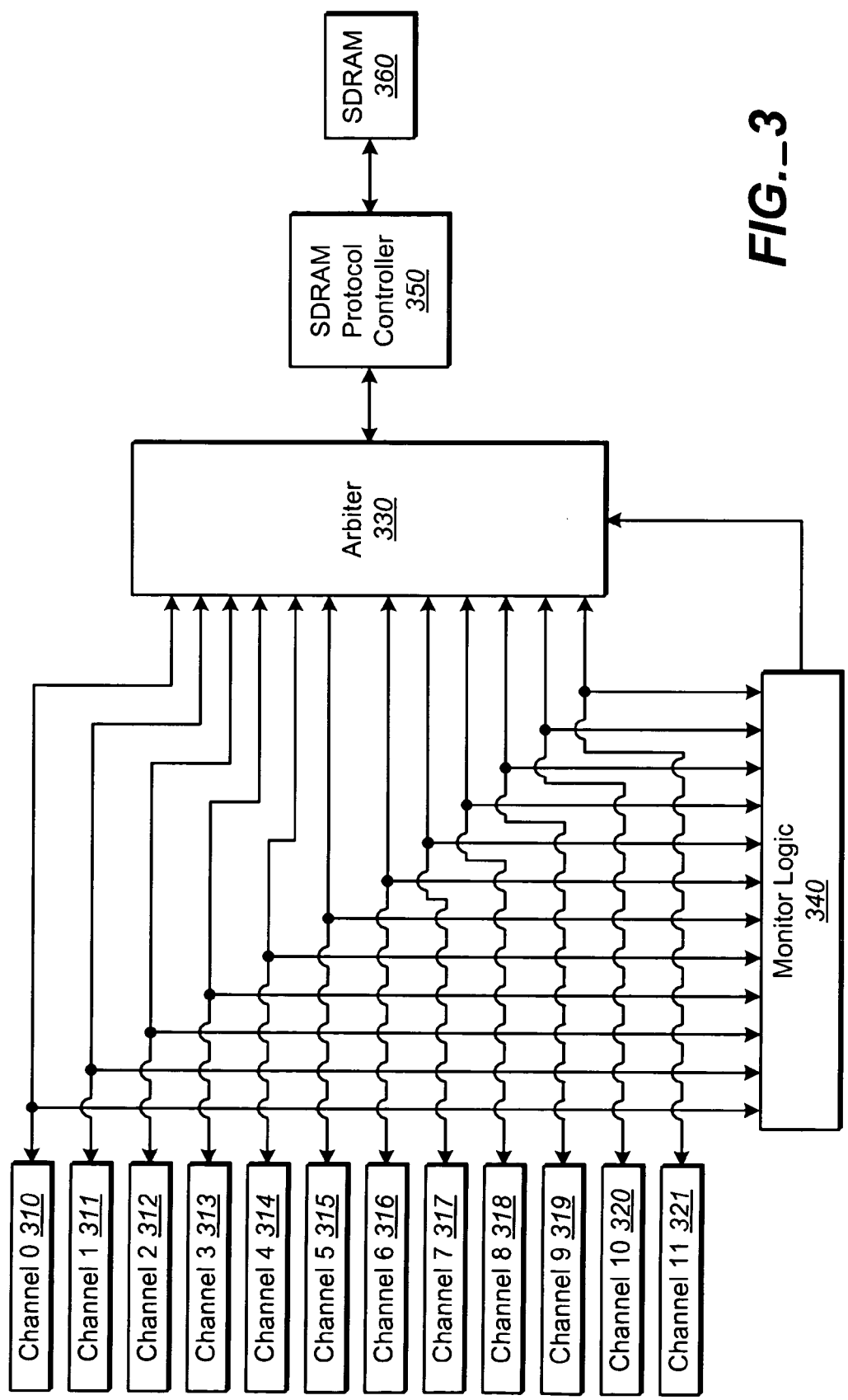
FIG._3

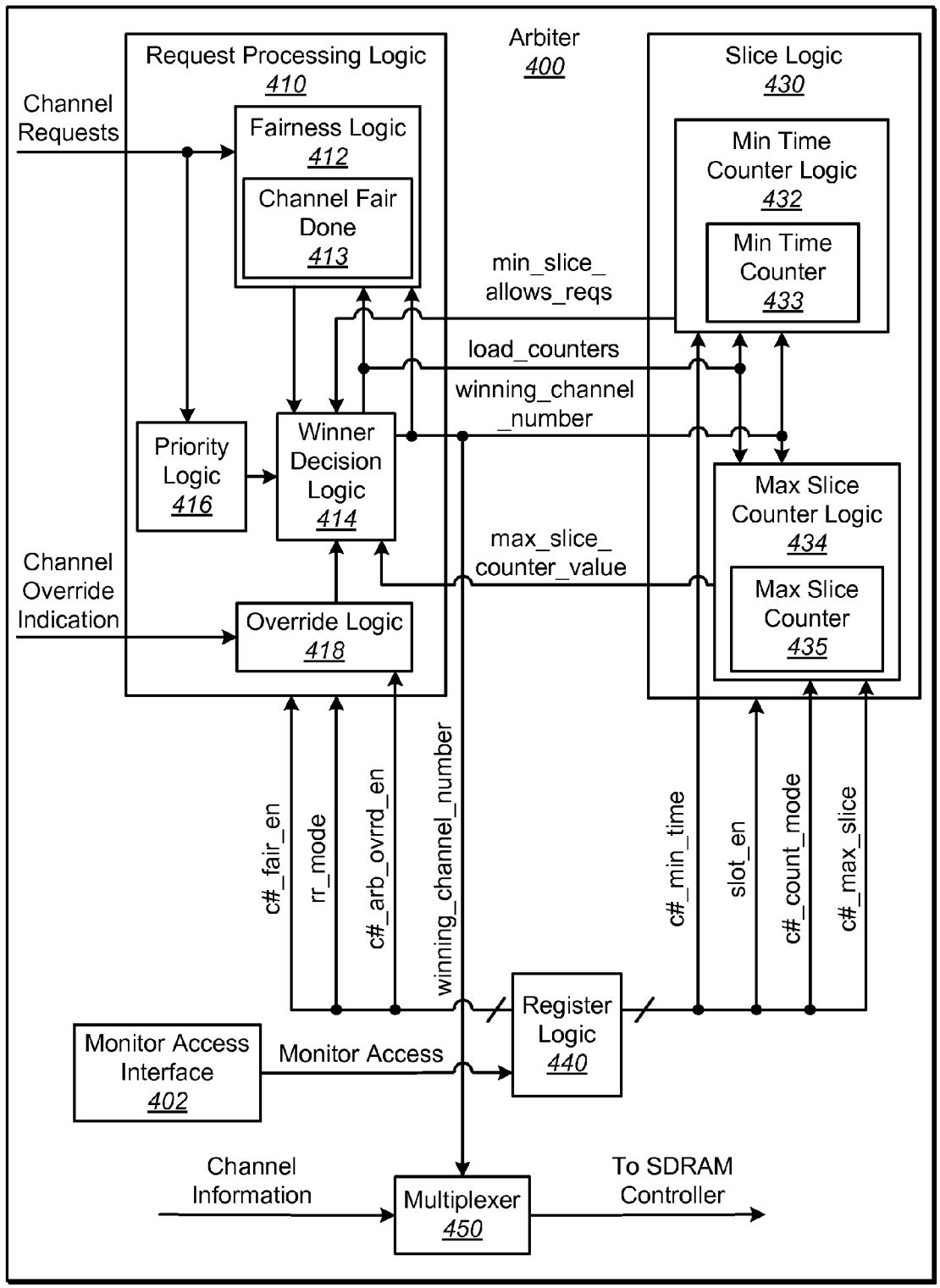
FIG._4

ARBITRATING ACCESS FOR A PLURALITY OF DATA CHANNEL INPUTS WITH DIFFERENT CHARACTERISTICS

BACKGROUND OF THE INVENTION

1. Technical Field

The present invention is directed generally toward improved access to a buffer memory. More particularly, the present invention relates to a method and apparatus for a configurable buffer arbiter.

2. Description of the Related Art

Most data controllers utilize external memory for temporary storage of data. For hard disk controllers in disk drive applications, this external memory is most likely Dynamic Random Access Memory (DRAM) due to the inexpensive nature of this type of memory. More particularly, Synchronous DRAM (SDRAM) is a type of dynamic RAM memory chip that is based on standard dynamic RAM chips, but has sophisticated features that makes it considerably faster. Still more particularly, Single Data Rate SDRAM (SDR SDRAM) is a flavor of DRAM that has a synchronous interface and Double Data Rate SDRAM (DDR SDRAM) is a flavor of SDRAM that transfers data on both clock edges of its interface.

DRAM memories have a row/column grid topology. Within the DRAM memory, a bank, row, and column number are used to specify a specific N-bit wide data element. Writing and reading is accomplished by specifying a bank, row, and column at which to start, bursting data to consecutive columns from the starting point until the desired data for this row is transferred, and then closing the row and preparing for the next operation.

In order to write data to or read data from a DRAM memory, a certain protocol must be employed. This protocol adds overhead and reduces the overall time available for data transfers.

The important commands of this protocol in the context of this invention are the following:

ACTIVE—This is a command sent to the memory to indicate that the controller wants to read or write a particular row in a particular memory bank. The specified row in the specified bank is opened so any column within this row can now be accessed.

READ/WRITE—These commands inform the memory whether the controller wants to read or write and the column within the row that this operation will start. Since the DRAM is burst oriented, it may be necessary for the controller to issue multiple read/write commands to the DRAM to keep the burst going.

PRECHARGE—After the read/write operation is complete, it is necessary to close the row before another row in the same bank can be opened. This is done with the precharge command.

In the description above, a bank is a "page" of memory locations. Single Data Rate (SDR SDRAM) memories can have either two or four banks, whereas Double Data Rate (DDR SDRAM) memories all have four banks. By having more than one bank, memory utilization can be increased since the active and precharge commands can be "hidden." This means that the precharge of a first bank that has recently been active or the active of a third bank that will next be active can take place while the memory is transferring data to/from a second bank. This method for hiding the overhead is called bank interleaving. Bank interleaving is not guaranteed to reduce overhead since consecutive accesses may be for rows in the same bank. For example, if the DRAM controller has four requests to transfer data to different rows in the same bank, the controller cannot use bank interleaving. However, if the DRAM controller has four requests to transfer data to different rows that are all in different banks, then the controller can use bank interleaving to possibly eliminate the overhead between these four transfers. Assuming that the accesses to the DRAM have an average distribution across the available banks, then the average overhead will be reduced using bank interleaving.

Based on the above information, it can be seen that DRAM is more efficient for transferring large chunks of data. Whether the access is for a single data element or for many data elements, the overhead to start and stop the transfer is the same. During the data burst periods between the open and precharge times, the DRAM provides data at its maximum bandwidth. For example, if the DRAM provides 32-bits every 5 ns, then it maintains 800 MBytes/sec during this data burst period. However, when the overhead on the DRAM interface of opening and precharging the DRAM is included, then the actual DRAM bandwidth can drop significantly. For example, the average bandwidth can often be reduced by 20% to 50%, depending on how often the overhead is required between data bursts.

The problem for the controller is that it has N channels, for example twelve in an exemplary implementation, all of which are competing for access to the same DRAM. Some of these channels normally burst large amounts of data that can exceed the width of a DRAM row, some burst only a few data elements at a time, and some transfer only one data element at a time. For the bursting channels, some of them require a certain amount of bandwidth (number of bytes per second). Some of these channels have critical latency requirements where access to the DRAM must be obtained within a certain time or else the system breaks. Some of these channels require fast access to the DRAM in order to keep the average system performance high.

Finally, some channels do not have a latency or bandwidth requirement. The bandwidth of each individual channel is less than the available bandwidth of the DRAM, but the sum of all channel bandwidths may or may not be less than the bandwidth of the DRAM.

Given channels with the characteristics above, the controller must share access to the DRAM between these channels in an intelligent way. The three main characteristics to optimize within a DDR controller are as follows:

1. Guaranteed Maximum Latency—Latency is the time that each channel must wait between accesses to the DRAM. Some channels must transfer data within certain latency or the system fails. Latency is adversely affected by long periods of activity by other channels. This is a good reason to keep the burst of each channel small, and to use first-in-first-out buffers (FIFOs) within the channels to continue the data transfer while waiting for access to the DRAM. In order to determine the sizes of the FIFOs that are needed, it is important to guarantee that the latency seen by each channel will not exceed a certain maximum value. This value should be as low as possible under the worst-case scenario.

2. Guaranteed Minimum Bandwidth—The system has a minimum bandwidth requirement, which, when met, keeps the system data rates at their required levels. Some channels must maintain a certain bandwidth over time to keep up with their connected devices or the system fails. Other channels must maintain a certain bandwidth or the system performance is affected to a degree that is unacceptable. Bandwidth is adversely affected by many small accesses, which are inefficient because they have a high overhead-to-data ratio. This is a good reason to keep bursts large when possible. This guaranteed bandwidth should be as high as possible under the worst-case scenario for the critical channels.

3. Average Bandwidth—The overall system performance is a function of many aspects, one of which is the average bandwidth that is available for channel access to the DRAM. The first and second parameters above guarantee that the system never fails or reaches unacceptable levels of performance, where this parameter attempts to provide a statistical average bandwidth that is much higher than this. The ideal goal for the average bandwidth is to support all of the channels simultaneously running at their maximum rate. In order to allow the performance to be as high as possible, it is good to design this parameter to be as high as possible under typical to more worse case scenarios.

The problem is that there is an inherent conflict between latency and bandwidth. It is possible to reduce the latency by reducing the burst lengths for each channel, but this could cause the bandwidth to be lower because the ratio of overhead-to-data increases. Similarly, if burst lengths are increased, the overall bandwidth will increase, but latency is going to increase as well. If the latency is too high, then it can cause FIFOs to overrun and/or parts of the system to be throttled. This will have a negative impact on the performance of the disk drive.

A solution is needed that can find the best compromise between these parameters to guarantee that under the worst case situation the system does not break and continues to perform at an acceptable level, and that under typical conditions the system performs at an excellent level (or as close as possible to the theoretical limit given by the external DRAM chosen). This solution should have the right static and dynamic configuration available to optimize the performance based on static and dynamic conditions in the system.

One previous solution was a strict priority arbitration scheme with a programmable bumping capability. This scheme allowed higher priority channels to bump lower priority channels to get access to the buffer if the higher priority channel allowed bumping. The bumping scheme was implemented by using "Can Bump" and "Can't Be Bumped" static configuration bits. Each channel had two bits, a "Can Bump" bit indicating whether it is allowed to bump another channel and a "Can't Be Bumped" bit indicating whether another channel can bump it. For instance, the critical single access channel mentioned above would have both its "Can Bump" and "Can't Be Bumped" bits set. This would allow it to bump other channels, but once active, it cannot be bumped by another channel. Another example would be a bursty low priority channel. It would have its "Can Bump" and "Can't Be Bumped" bits both cleared. This would allow any higher priority channel to come in and take its buffer access away. This would also prevent this channel from hurting bandwidth by bumping anyone else. Instead, it would wait until the more natural boundaries where the higher priority channels are done with their bursts and then start its burst.

In order to make this priority scheme as efficient as possible, channels had minimum thresholds that they had to meet before they were allowed to attempt to access the buffer. This would hold them off until they had enough data for a long burst and free up the buffer for access by other channels. The high priority channel was a bursting channel that had two thresholds to manage its request to the arbiter. When the amount of availability exceeded a first "critical" threshold, a burst was initiated. When the amount became less than a second threshold, then continuing requests were made only if no one else was requesting. This attempted to give a "critical" indication that helped the arbiter to make smarter decisions about optimizing bandwidth and minimizing latency.

One advantage of a priority-based scheme is that it has a good average overall bandwidth while meeting minimum latency goals for at least the highest priority channel in the system. The good bandwidth is achieved because the highest priority channels perform long efficient bursts and then leave long holes that are filled by the lower priorities. This method also does not waste any cycles since it immediately moves to the next channel when the current channel's request has deasserted.

A disadvantage of this solution is that it does not guarantee a maximum latency and minimum bandwidth to any channel except for the highest priority channel. This is because the highest priority channel can continue to burst to the DRAM for a long time that is not limited by a predictable boundary. This was acceptable in an older system because the older system only had one critical channel that needed these parameters to be guaranteed. New and upcoming systems may have more than one of these critical channels. In the strict priority based solution, the lowest priority channel can get locked out for a long time by the channels with higher priority.

Another disadvantage of this solution is that it does not adapt to changing conditions. If the bandwidth is not enough to cover all of the channels running at the worst-case rate, then it can be useful to change the priority or other properties of the channels dynamically. For example, if a given channel that normally is not critical has suddenly been detected to be critical, then it would be useful to change its parameters so it could bump another higher priority channel that is not as critical.

One more disadvantage of the old priority arbitration scheme is the unpredictability of sizing FIFOs. Because of the many high priority channels competing for access to the DRAM, it is difficult to predict how long any lower priority channel will have to wait for access. Therefore, choosing FIFO sizes for these lower priority channels becomes very difficult. Choosing a FIFO size that is too large is costly in terms of wasted die size. Choosing a FIFO size which is too small can make the system inefficient or may break the system altogether.

Other arbitration schemes that have been implemented in the industry include the following:

Time-Slot based round robin scheme:
  In this scheme, every channel gets a guaranteed time-slot where a token is passed around to each channel. When the time-slot is used up, the channel is pre-empted and the token is given to the next channel in line. If the channel finishes early, it gives up the token.
  The advantage of the strict Time-Slot based round robin scheme is that it does guarantee a fixed maximum latency per channel and a fixed minimum bandwidth per channel.
  The disadvantage is that the time-slot size is usually fixed for each channel, so if a channel does not need all of its time-slot, then part of this time is wasted. So even though the latencies per channel are fixed, they can be longer than required based on the amount of data transferred. Even if the time-slot was made to be abortable when the request deasserted, another problem would be that some channels end their requests and then put out another request, but need both requests to be serviced within one time-slot. The standard time-slot scheme with an early abort would end the time-slot when the request first goes away. Another disadvantage is that the time-slot size is not adjusted based on dynamic conditions.

Non Time-Slot based round robin scheme:
  In this scheme, every channel gets to keep the token until finished. Only when the channel is finished will the token be given to the next channel in line.
  The advantage is that every channel gets a turn eventually. The scheme is perfectly fair, and since there is no bumping, the bursts are nice and long, which results in a good minimum overall bandwidth.
  The disadvantage is that it does not guarantee a maximum latency to each channel since the burst lengths of the previous channels are not restricted. Also, it does not adjust to dynamic conditions.
First-come-First-Served scheme:
  In this scheme, the arbiter keeps track of the order of the requesting channels. An example of this scheme (and its efficiency) is a telephone customer service system.
  An advantage is that the minimum overall bandwidth is good because the burst lengths are not limited again. Also, the sooner access is requested, the sooner it will be granted, so channels are not locked out for indefinite periods as in the strict priority scheme. This scheme is also fair since it does not favor any channel.
  However, the disadvantages are that critical channels are not serviced with higher priority and the scheme does not guarantee a maximum latency to each channel. Also, the scheme does not adjust to dynamic conditions.

There is one example that combines known solutions. In this example, a priority arbiter is implemented with a fairness register. The fairness register has a bit per channel where a given channel's bit is set when the channel wins access, and all bits are cleared when the channel completes its transfer and no channel without a fairness bit set is requesting. This is used to make sure each channel is able to get a transfer in before a different channel performs two transfers. But it still allows higher priority channels to go first when starting from an idle condition where the fairness register is all cleared. The disadvantage of this solution is that it does not guarantee a maximum latency per channel or a minimum bandwidth per channel.

None of the above solutions provide the right configurability to provide guaranteed bandwidth/latencies to each channel while also providing an optimal average bandwidth/latency mix. Furthermore, the above solutions do not have the right configurability to adjust to new problems, which arise in the field, such as the need for a channel to be given a higher level of importance while the other channels remain with a secondary level of importance.

SUMMARY OF THE INVENTION

The present invention recognizes the disadvantages of the prior art and provides a configurable buffer arbiter that combines a time-slot based algorithm, a fairness-based algorithm, and a priority-based algorithm to meet the bandwidth and latency requirements of multiple channels needing access to a buffer memory. These channels have different static and dynamic characteristics with which the arbiter may work. The static channel characteristics include aspects such as a required latency for access to the buffer memory, a required bandwidth to the buffer memory, a preferred latency or bandwidth to the buffer memory, the amount of data the channel can burst in each access to the buffer memory, and the ability for the channel to continuously burst its data to the buffer memory with or without any pauses. The dynamic characteristics include aspects such as whether a channel's FIFO is nearing full or empty, or whether one of the static characteristics has suddenly become more critical. The arbiter can be tuned with configuration to adjust to both the static and the dynamic characteristics of these channels. This configuration can be set during initialization or by a block that monitors the dynamic characteristics of the channels.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a pictorial representation of a storage area network in which exemplary aspects of the present invention may be implemented;

FIG. 2 is a block diagram illustrating a disk controller in accordance with an exemplary embodiment of the present invention;

FIG. 3 is a block diagram illustrating a memory access system in accordance with an exemplary embodiment of the present invention;

FIG. 4 illustrates further detail within the arbiter block in accordance with an exemplary embodiment of the present invention.

DETAILED DESCRIPTION

Figure 5:
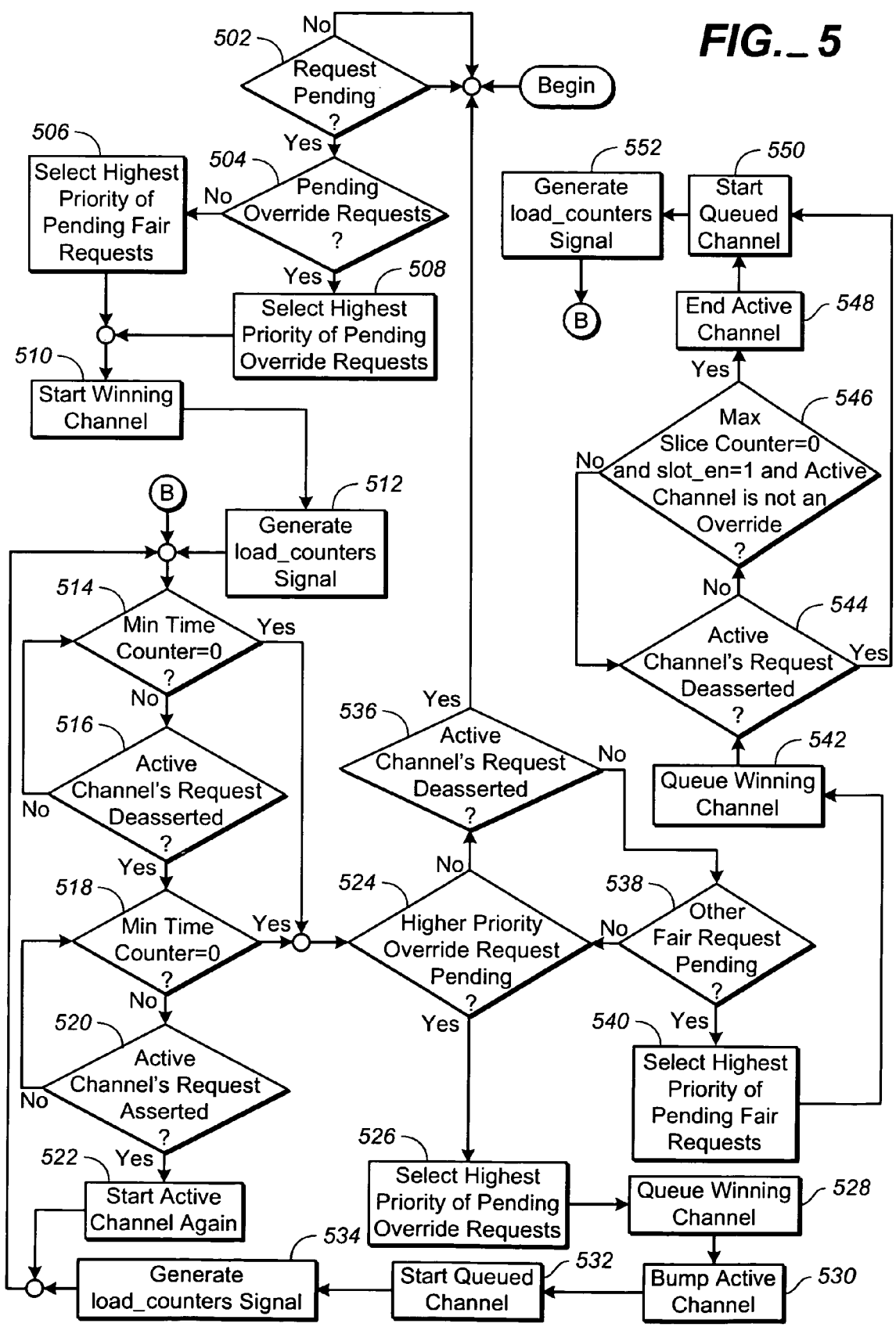
FIG. 5 is a flowchart illustrating the operation of a configurable arbiter in accordance with an exemplary embodiment of the present invention.

The present invention provides a method and apparatus for a configurable buffer arbiter. The following FIGS. 1 and 2 are provided as exemplary diagrams of environments in which he present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a storage area network in which exemplary aspects of the present invention may be implemented. Storage area network (SAN) 100 contains SAN fabric 102, which is a combination of interconnected switches that collectively provide a routing infrastructure within SAN 100. Fabric 102 may be, for example, a fibre channel (FC) fabric or other transport technology. Alternatively, fabric 102 may simply be a protocol bus, such as a small computer system interface (SCSI) bus or, more particularly, serially attached SCSI (SAS) technology.

In the depicted example, host 112 is connected to fabric 102 via host bus adapter (HBA) 114 and host 122 is connected to fabric 102 via HBA 124. Disk drive 132 is connected to fabric 102 via disk drive controller 134. Hosts 112, 122 may be, for example, personal computers, network computers, servers, or the like. In the depicted example, hosts 112, 122 access disk drive 132 through the SAN fabric. SAN 100 may include additional hosts and/or other storage devices not shown. FIG. 1 is intended as an example, and not as an architectural limitation for the present invention.

FIG. 2 is a block diagram illustrating a disk controller in accordance with an exemplary embodiment of the present invention. The overall architecture of a disk controller is described in further detail in patent application entitled "SCALABLE ARCHITECTURE FOR CONTEXT EXECUTION," U.S. Pat. No. 7,334,056, filed Aug. 9, 2004, and herein incorporated by reference. Disk drive controller 200 may be, for example, disk drive controller 134 in FIG. 1. Disk drive controller 200 includes a host side and a disk side. Disk drive controller 200 may be included in the electronics of a storage device. The storage device includes a data storage medium, such as storage disks, that is coupled to servo and read/write channel 240. On the host side, data controller 210 receives data transfer requests from one or more host devices connected by the fabric or protocol bus. On the disk side, servo read/write channel 240 moves data to or from the disk.

Servo and read/write channel 240 is coupled to a data controller 210 and a microprocessor 220. Data controller 210 is coupled to memory 230 and a peripheral bus, which is preferably part of a SAN fabric, such as fabric 102 in FIG. 1. Memory 230 is preferably a synchronous dynamic random access memory (SDRAM) based memory device. Memory 230 may be logically divided into several segments, including context buffer 232, data buffer 234, and table buffer 236, for example.

The general function of data controller 210 is to process commands from a requester or initiator, such as host computer 112 in FIG. 1. A host computer can be a personal computer, workstation, server, or other peripheral device. Data controller 210 performs data transfers associated with those commands with the data storage medium, e.g., magnetic or optical disk. In more detail, data controller 210 processes the commands for the associated data transfers. The commands may not request data transfers, but may request status of the storage device. Data controller 210 must also process these commands. For commands that request write data transfer, data controller 210 first transfers data from the peripheral bus to the data buffer 234, then from the data buffer 234 to the Servo and Read/Write Channel 240. For commands that request read data transfer, the data controller 210 first transfers data from the Servo and Read/Write Channel 240 to the data buffer 234, then from the data buffer 234 to the peripheral bus.

Data controller 210 contains a plurality of channels that access memory 230. For example, data controller 210 may include one or more direct memory access (DMA) channels to move data from the peripheral bus to the data buffer 234. Data controller 210 may also include logic to save commands received from the peripheral bus into a different segment of memory 230. Data controller 210 may also include a DMA channel to move data from data buffer 234 to servo and read/write channel 240. Data controller 210 may also include other channels to store tables of information used to control these transfers such as defect information or disk format information. Microprocessor 220 may also be able to access memory 230 through a channel in data controller 210. Other channels may exist for other reasons. In all, there may be twelve channels accessing memory 230, although there may be more or fewer channels depending upon the implementation. Thus, data controller 210 may include a buffer arbiter for managing access to the memory by the plurality of channels. Data controller 210 may also include a memory protocol controller, such as a SDRAM protocol controller, that interfaces between the buffer arbiter and the memory 230.

FIG. 3 is a block diagram illustrating a memory access system in accordance with an exemplary embodiment of the present invention. Multiple channels 310-321 assert requests to arbiter 330 when they desire access to SDRAM 360. Each channel with a request asserted also gives the arbiter channel information that includes fields, such as the buffer address to use and the byte enables. These channels may come from other blocks in an overall system, which need to transfer data with SDRAM 360, such as direct memory access (DMA) blocks in a data storage controller. Arbiter 330 picks a winner from channels 310-321 and passes the information from the winning channel with a request to SDRAM protocol controller 350. SDRAM protocol controller 350 then performs SDRAM protocol operations to transfer the channel's data with SDRAM 360. The exemplary aspects of the present invention may be embodied in the arbiter block 330.

Monitor block 340 is also shown in FIG. 3. This block monitors which channels have something critical to do, and can adjust the configurable parameters in arbiter 330 to dynamically give higher priority to a channel that becomes critical. In one exemplary embodiment of the present invention, monitor 340 is implemented as part of a micro-sequencer, which controls a part of the system associated with about half of the channels. Thus, monitor 340 may make decisions based on knowledge of this part of the system only, but could be extended to monitor more or all of the system as shown in FIG. 3.

FIG. 4 illustrates further detail within the arbiter block in accordance with an exemplary embodiment of the present invention. Arbiter 400, such as arbiter 330 in Fig. 3, includes three main blocks in the arbiter: request processing logic 410, slice logic 430, and register logic 440. Requests for buffer access come in to request processing logic 410 in the form of a request signal with associated channel information. Request processing logic 410 keeps track of the history of channels that have won access and makes a decision about which channel has the highest priority for being the next channel to queue to the SDRAM protocol controller through multiplexer 450. This decision is based on a combination of factors, such as the priority of the channels, the round robin state (which channel is next in the round robin loop), and which channel has been given special characteristics that give the channel higher priority. Slice logic 430 contains two counters and associated logic that are used to determine how long each channel can burst once its request is serviced. Register logic 440 contains configuration registers that specify how request processing logic 410 and slice logic 430 should operate at a given moment. Monitor access interface 402 allows some intelligent monitor logic, such as monitor logic 340, to alter the state of register logic 440 dynamically based on the information being monitored regarding the channels.

The following is a description of the configuration bits that are present in the preferred embodiment of register logic 440:

slot_en—Global enable for the use of slice logic 430. This signal, when asserted, enables the use of slice logic 430 to create windows of time where the channels are allowed to continue their bursts before being interrupting by another channel. When this signal is deasserted, then slice logic 430 is not used to determine how long a channel's burst can continue.

c#_min_time—Programmable minimum time for each channel (# is the channel number). This parameter specifies the minimum time in units of clock cycles that is guaranteed for a channel's burst. This field is only used when the slot_en mode is asserted.

c#_max_slice—Programmable max slice size for each channel (# is the channel number). This parameter specifies the maximum time in units of either clock cycles or data elements that is allowed for a channel's burst to continue when other requests are pending. This field is only used when the slot_en mode is asserted.

c#_count_mode—Programmable bit for each channel (# is the channel number) indicating whether the c#_max_slice is specified in units of clock cycles or data elements. This field is only used when the slot_en mode is asserted.

rr_mode—Global enable for round robin mode. This signal, when asserted, enables the use of fairness logic 412 to create a round robin like ordering of the channels. When this signal is deasserted, then request processing logic 410 makes its decision on which request to service next by using priority logic 416 and assuming that all requesting channels are eligible for consideration to go next.

c#_fair_en—Programmable fairness enable for each channel (# is the channel number). These bits have the same control as rr_mode, except on a per channel basis. This field is only used when the rr_mode mode is asserted.

c#_arb_ovrrd_en—Programmable bit for each channel (# is the channel number) indicating whether each channel is allowed to specify that it has override priority. In an exemplary implementation, each channel is always requesting override priority, so this field is used to assign override priority to a channel. Optionally, a channel may participate in deciding if it should have this override priority based on information it understands.

Slice logic 430 is only used if slot_en is asserted. Slice logic 430 contains two counter logic blocks: min time counter logic 432 and max slice counter logic 434. When a channel becomes active with a burst of data to/from the SDRAM controller, the winning channel's c#_min_time and c#_max_slice are loaded into min time counter 433 and max slice counter 435 registers by the assertion of the load_counters signal. The load_counters signal is a pulse that occurs when a channel begins its data burst. These counters then begin to count down to zero as the new channel is performing its burst of data to/from the SDRAM. The min time counter 433 decrements in units of clock cycles, and the max slice counter 435 decrements in units of either clock cycles or data elements as specified by c#_count_mode. As long as one counter is greater than zero, then the window defined by that counter is still in existence. The min_slice_allows_reqs signal indicates that the min time counter 433 is zero, and the max_slice_counter_value signal indicates the current value of the max slice counter 435.

When the rr_mode is zero or the c#_fair_en bits are all zero, and slot_en is zero, then only priority logic 416 in request processing logic 410 is used by winner decision logic 414 to determine the highest priority channel of all the requesting channels. In an exemplary implementation, the priority order in priority logic 416 is fixed, with channel 0 having the highest priority and channel 11 having the lowest priority. The more critical devices needing to access the SDRAM are assigned to the lower channel numbers, and the less critical devices are assigned to the higher channel numbers. This mode of operation is similar to the priority scheme in the prior art.

If the rr_mode signal is high and one or more of the c#_fair_en bits are high, and slot_en is high, then fairness logic 412 and slice logic 430 assist priority logic 416 in helping the winner decision logic to determine the next highest priority channel to queue to the SDRAM controller. Fairness logic 412 contains the channel fair done register 413, which has a bit for each channel to indicate if a given channel has already had its turn during the current round robin loop. At the same time that the load_counters signal loads the slice logic counters, the bit in channel fair done register 413 that is associated with the winning channel is set. When a channel's fair done bit is set in register 413, the associated channel's request is blocked from winner decision logic 414. When winner decision logic 414 can no longer see any requests pending, and the min_slice_allows_reqs signal is asserted to indicate that the current channel's guaranteed burst period is over, then an assumption is made that the current round robin loop must be over and all bits in channel fair done register 413 are reset. For example, once all of the channels have won arbitration, all of the bits in the channel fair done register 413 will be set and all requests to winner decision logic 414 will be blocked, so the channel fair done register 413 will be cleared.

If multiple channels' requests are asserted and not blocked by fairness logic 412, then winner decision logic 414 selects the highest priority of these requests as indicated by priority logic 416. Note that other methods could be used to break the tie. For example, a least recently used scheme could remember which channel was the last one of the requesting channels to win, and select this channel as the next winner. However, the advantage of predetermined selection criteria is that the priority order has been selected based on channels that can become more critical. Hence, to break the tie, selecting the channel that may need less latency is a good choice.

If all the channels are requesting, then channel 0 will win first, and then 1, 2, 3, and so forth until channel 11 wins. The channel fair done register will start at zero. When channel 0 wins, bit 0 will be set. When channel 1 wins, bit 1 will be set. This continues until bit 11 is set. At this time, all channels are blocked, and the channel fair done register 413 is cleared.

However, during normal operation, it is rare that all of the channels are requesting simultaneously. This is the worst-case situation that defines the worst-case latency. The more normal case is that only a few of the channels are simultaneously requesting. In this case, there are two ways to set channel fair done register 413. One way is to never set bits in channel fair done register 413 for channels that are not requesting. For example, if channels 2, 4, 6, and 8 are initially requesting and then channel 3 asserts its request right after channel 6 has won arbitration, then the order would be 2, 4, 6, 3, and 8. This is because channel fair done register 413 did not block channel 3 until it won and it has higher priority than 8. Another way to handle channels that are not requesting is to set their channel fair done bit whenever a higher number channel wins arbitration. In this case, when channel 4 wins, the bits associated with channels 0 through 3 are all set in channel fair done register 413. Therefore, in the example above, the order would then be 2, 4, 6, 8, and then 3. Channel 3 would win after the channel fair done register 413 is reset and a new round robin loop is started.

Winner decision logic 414 uses the min_slice_allows_reqs signal to determine when to start a new arbitration decision. For example, when the load_counters signal pulses, the winning channel's c#_min_time value is loaded into the min time counter 433 and the min_slice_allows_reqs signal is deasserted. The min time counter 433 starts to decrement down as this channel performs its burst of data with the SDRAM. During this time, winner decision logic 414 ignores all requests coming from either priority logic 416 or fairness logic 412, except for the request of the channel that is currently performing the burst. If the current channel needs to temporarily deassert its request, it will not lose access to the SDRAM during this time even though its bit is set in channel fair done register 413. This can be useful in cases where it needs to deassert its request briefly, for example, to move to a different address in the buffer. When min time counter 433 becomes zero, then the min_slice_allows_reqs signal asserts again and winner decision logic 414 now can only see the requests of other channels that fairness logic 412 is not blocking. Winner decision logic 414 picks a winner from one of these channels and queues it to the SDRAM controller behind the current channel.

Even when a second channel is queued behind a first channel that is performing a burst of data with the SDRAM, the first channel's burst is not immediately ended. Instead, the first channel will continue to burst until one of two events occur:

(1) The first channel's request deasserts and the min_slice_allows_reqs signal is high; or
(2) The first channel is still requesting, the min_slice_allows_reqs signal is high, and the max_slice_counter counts down to 0. When the max_slice_counter reaches zero and a second channel is queued up, then the first channel's burst is ended so the second channel can begin its burst.

In this way, max slice counter 435 specifies a window where a channel can continue its burst as long as it is still requesting. If no other channels are requesting, then a current channel that is bursting data with the SDRAM will be allowed to continue its burst until its request deasserts, even if its max slice counter becomes zero. The c#_max_slice value provides a means through max slice counter logic 434 for limiting the latency that other channels will see due to each channel's burst. The maximum latency for a given channel can be calculated by summing the maximum burst times for all of the other channels that can occur given the c#_max_slice settings.

When c#_max_slice is set to 0, this is a special control to prevent the channel from being seen by winner decision logic 414. When c#_max_slice is set to its max value, this is a special control to indicate that the channel has infinite max slice time. In this case, the channel will always continue its burst until it deasserts its request with the min_slice_allows_reqs signal high.

The c#_min_time and c#_max_slice parameters can be used to give channels more or less bandwidth and latency. Larger values of c#_max_slice will allow a channel to have more bandwidth on each round robin loop, and smaller values will allow a channel to have less bandwidth, but larger values of c#_max_slice will create more latency for other channels. So these parameters must be balanced against each other to find an optimal solution where all of the channels get enough bandwidth to service their needs, and no channel sees too much latency to cause a problem, such as overflowing a FIFO. Methods for deriving this solution can include trial and error using simulations of the actual system or a model of the system, or spreadsheet type modeling that provides the required bandwidth and latency of each channel and then iterates on solutions for the actual bandwidth and latency of each channel until the requirements are achieved. An exemplary method for setting the c#_min_time times is as follows. If a channel will always keep its request high during a time where it needs to be transferring data, then set the c#_min_time to zero for this channel. Otherwise, the c#_min_time is set to be about the same value as the c#_max_slice value. This helps to guarantee that channels which can deassert their requests during their bursts will still get enough bandwidth on each round robin loop.

One small performance issue exists for channels that have a c#_min_time that is non-zero. If these channels complete all of the data that they have for bursting to the SDRAM while min time counter 433 is still non-zero, then the rest of the window until min time counter 433 reaches zero represents buffer bandwidth that is wasted. This is because no other channel is allowed to win during this time since winner decision logic 414 reserves the SDRAM for the current channel until the min_slice_allows_reqs signal asserts. To help eliminate the wasted bandwidth, a done indication is added in the channel information associated with each channel's request. The channel information is provided from the logic that provides the channel request. A channel may use the done indication to indicate that it is sure that at this moment it has no need to burst any further data. When the done indication bit for the currently active channel asserts, min time counter logic 432 clears min time counter 433, which causes the min_slice_allows_reqs signal to assert. If the channel does have more data to burst but must, for some reason, deassert its request temporarily, then the done indication bit is not asserted during the time where the request is low. This feature allows the min slice to be programmed large enough to guarantee a minimum amount of transfer occurs (even if the request goes low during the min time), and if the channel has knowledge that it is really done, it can abort this min time by asserting its done bit.

Override logic 418 provides input to winner decision logic 414 that can cause the winner decision logic 414 to ignore the normal fairness logic 412 based decision criteria. If a requesting channel has its override indication asserted, then it is considered as extremely urgent. In this case, the channel takes priority over all of the requests that do not have the override indication asserted and the request is passed to winner decision logic 414 even if its associated channel fair done 413 bit is set. If multiple channels request with the override indication set, then the priority 5 logic is used to select the highest priority of these override channels as the winner. When an override request is present, then any non-override channels that are currently queued in the SDRAM controller are bumped. In the preferred embodiment however, this bumping does not occur until the min_slice_allows_reqs signal asserts. Bumping is described in the prior art. However, one difference from the prior art is that when an override channel bumps a given channel, then the given channel has lost its turn in the current round robin loop unfairly. To fix this, the bumped channel's bit in the channel fair done register 413 is cleared. This allows the bumped channel to get another full slice in the current round robin loop. Override channels are not limited by the max slice counter logic either. An override channel will continue its burst until its request deasserts and the min_slice_allows_reqs signal is asserted.

There is also the possibility of having a hybrid priority and fairness based configuration. In this hybrid configuration, the fairness logic and slice logic is being used, but some channels are not participating in the fairness scheme. This allows these channels to participate in arbitration at every turn, and, if priority logic 416 indicates they are the highest priority, they win arbitration. This is accomplished by having the c#_fair_en bit cleared for these channels. This can be used to give a channel more priority, which results in higher bandwidth and/or lower latencies for this channel.

Monitor access interface 402 to register logic 440 allows monitor logic, such as monitor logic 340 in FIG. 3, to change the parameters in register logic 440. In an exemplary implementation, a micro sequencer monitors several of these channels to determine which channels actively need to transfer at any time. Some of these channels have stricter requirements for maximum latency and minimum bandwidth in order to prevent FIFOs from becoming full and creating severe problems on the side filling the FIFOs. If these channels are active, then monitoring logic 340 gives these channels a larger min and max slice time, and reduces some of the less critical channels' min and max slice times in order to meet these requirements. If monitoring logic 340 sees that the critical FIFOs are starting to be close to full, then monitoring logic 340 can disable the less critical channels altogether by setting the max slice time to zero. If one or more of these critical channels are not active, then the micro sequencer can give more priority to the less critical channels by increasing their min and max slice times.

The monitor can use other options to alter a channels priority as well. For example, if a channel is very critical and it will create a catastrophic event, such as a FIFO overrun, in the very near future, then the monitor can enable the channel to have an override request, which gives the channel immediate access. Another option, which is less intrusive to the round robin scheme but can further help to reduce the latency to service the request, is to alter the channel so it is not governed by the fairness register. This is especially useful if the channels are still ordered in the priority logic so that the critical channels have a higher priority and will win if they are requesting while others are requesting.

FIG. 5 is a flowchart that illustrates the operation of a configurable arbiter in accordance with an exemplary embodiment of the present invention. The process begins by waiting for a channel to request access to the memory (block 502). In this block, the arbiter is looking for an active channel's request that is either fair or has the override qualification. A fair request is a channel's request that is not blocked by the associated bit for the channel in the channel fair done register 413. The fairness logic blocks a channel's request if the associated channel fair done bit is asserted and the associated c#_fair_en bit is asserted. A channel's request has the override qualification if the channel is requesting override privilege and the associated c#_arb_ovrrd_en bit is asserted.

When the arbiter detects that one or more fair or override requests are pending, it determines whether any of these pending requests have the override qualification (block 504). If they do, then the arbiter selects the highest priority of the pending requests that have the override qualification (block 508). The priority between override channels can be based on a fixed or rotating priority that is selected only for the purpose of breaking the tie, on a fixed priority based on the general characteristics of the channels, or on a configurable or calculated priority that is based on the current urgency of each channel. Once an override channel is selected as the winner, the process continues at block 510.

If in block 504 there are no channels requesting with the override qualification, then the arbiter selects the highest priority of the pending fair requests (block 506). The priority between fair requests can be based on a fixed or rotating priority that is selected only for the purpose of breaking the tie, on a fixed priority based on the general characteristics of the channels, or on a configurable or calculated priority that is based on the current urgency of each channel. Once an override channel is selected as the winner, the process continues at block 510.

Block 510 starts the winning channel by passing the information about the channel to the memory protocol controller. Then the load_counters signal is pulsed (block 512). The load_counters signal causes the Min Time Counter to be loaded with the starting channel's 10 associated c#_min_time value and the Max Slice Counter to be loaded with the starting channel's c#_max_slice value. Also, the winning channel's associated bit in the channel fair done register is set to the asserted state. If rr_mode is asserted, then all higher priority channels will have their associated bit in the channel fair done register also be set to the asserted state at this time. This makes it look as if these channels were skipped in the current round robin loop since their requests were not pending at this time. If rr_mode is deasserted, then only the winning channel's bit will be set in the channel fair done register and the other high priority channels will still be enabled for winning if they request. If after setting the channel fair done register bit(s) there are no other channels requesting whose associated bit in the channel fair done register is cleared, then all bits in the channel fair done register are cleared to allow all requests to be fair again. If slot_en is deasserted, then the Min Time Counter is instead loaded with zero and the Max Slice Counter is ignored.

Now that a channel is currently bursting with the memory, the arbiter checks for the Min Time Counter to decrement to zero (block 514). When it does, then operation continues at block 524. If the Min Time Counter is greater than zero, then the arbiter checks to see if the active channel's request deasserts (block 516). As long as the active channel's request is asserted and the Min Time Counter is greater than zero, then the arbiter will continue to cycle between blocks 514 and 516 to look for one of these conditions to change. If the active channel's request does deassert while the Min Time Counter is still greater than zero, then the arbiter proceeds to a different loop in block 518 and 520. When a channel's request deasserts, its transfer of data stops in the memory protocol controller.

In block 518, the arbiter performs the same check as in block 514 to see if the Min Time Counter has reached zero yet. In block 520, the arbiter checks to see if the active channel's request has asserted again. If the active channel's request asserts again while the Min Time Counter is still greater than zero, then the arbiter will proceed to block 522 to start the active channel again in the memory protocol controller. However, the load_counters signal does not pulse in this case so the Min Time and Max Slice counters continue to decrement during this time. Block 522 then proceeds back to the loop defined by blocks 514 and 516.

If at any time while the process is in blocks 514-520 the active channel asserts its done indication, then the Min Time Counter will be reset to 0. The channel can use the done indication to communicate to the arbiter that when the channel deasserts its request it will truly have no more data to transfer for a while, so the arbiter should not wait the Min Time count for its request to assert again.

When in block 514 or block 518 the Min Time Counter is detected to be zero, then the arbiter no longer reserves the memory protocol controller for only the active channel and proceeds to block 524. Now the arbiter will attempt to queue up a new channel to the memory protocol controller so the memory protocol controller can attempt to bank interleave the new channel with the active channel when the active channel finishes its transfer. In block 524, the arbiter checks if a higher priority channel is requesting with the override qualification. If the active channel does not have the override qualification, then any requesting channel with the override qualification is considered as higher priority. If the active channel does have the override qualification, then only requesting channels with an override qualification that are higher priority as determined by criteria such as those used in block 508 will be considered as higher priority in block 524. If such an override channel exists that is higher priority than the active channel, then the arbiter continues at block 526. Otherwise, the arbiter continues at block 536.

In block 526, the arbiter selects the highest priority of the pending override requests using the same priority criterion as used in block 508. Then the arbiter queues the winning channel to the memory protocol controller to allow the memory protocol controller the opportunity to attempt to bank interleave the data transfer for the queued channel (block 528). Once the memory protocol controller has opened the bank for the queued channel or determined that the bank cannot be opened, then the arbiter will bump the active channel (block 530).

When the active channel is bumped, its transfer with the memory protocol controller stops and it will not continue its transfer until the arbiter again selects the channel as a winner. If the active channel is still requesting and the Max Slice Counter has not reached zero, then the channel fair done register bit associated with the active channel is set to the deasserted state when the active channel is bumped since it did not receive its full time as allowed by its c#_max_slice. This helps the bumped channel to get back some of the bandwidth taken by the override channel. However, as can be seen, when an override channel comes in, then the latency and bandwidth is no longer guaranteed for all of the channels. So channels should use the override qualification only when necessary to prevent a catastrophic event, such as a FIFO overflow, from occurring. After the active channel is bumped, the queued override channel is started in the memory protocol controller (block 532) and the load_counters signal is pulsed (block 534). Then operation continues in block 514.

In block 536, the arbiter checks if the active channel's request has deasserted. If so, then the arbiter returns to the beginning state in block 502 since there are no longer any channels active in the memory protocol controller. If not, then the arbiter checks to see if any other fair requests are pending (block 538). If there are no other fair requests pending, then the arbiter returns to block 524 and continues to loop between blocks 524, 536, and 538 until either the active channel deasserts its request because it has no more data to transfer, or another channel requests to transfer. If in block 538 another fair request is detected, then the arbiter selects the highest priority of the pending fair requests using the same criterion as used in block 506 (block 540). Then the arbiter queues the winning channel to the memory protocol controller to allow the memory protocol controller the opportunity to bank interleave the queued channel with the active channel (block 542).

The arbiter now starts a loop as defined by blocks 544-546 where it waits for either the active channel's request to deassert (block 544) or the Max Slice Counter to reach zero (block 546). If the Max Slice Counter reaches zero first, then the arbiter ends the active channel's transfer with the memory protocol controller (block 548) and then proceeds to start the queued channel (block 550) and to pulse the load_counters signal (block 552). If the active channel's request deasserts before the Max Slice Counter reaches zero, then the arbiter proceeds directly to start the queued channel (block 550) and to pulse the load_counters signal (block 552). After the load_counters signal is pulsed (block 552), the arbiter continues at block 514 to wait for the Min Time Counter to reach zero again. In block 546, if slot_en is deasserted, then the Max Slice Counter is ignored and the active channel's transfer will continue until its request deasserts. Also in block 546, if the active channel has the override qualification, then the Max Slice Counter is ignored and the active channel's transfer will continue until its request deasserts.

Thus, the present invention solves the disadvantages of the prior art by providing a configurable buffer arbiter. The main advantage of the invention is the dynamic and static configurability. Through the dynamic and static configuration, the monitor logic can maintain system throughput and prevent channels from overflowing with data or becoming starved of data. There are several ways available for the monitor to do this. The monitor could give a channel a larger slice and compensate by reducing the slice of another channel. This would allow one channel more buffer access, but could cause the channel with reduced buffer access to perform poorly. However, it would be up to the monitor to perform the slice balancing in this case to prevent this from becoming a problem for the system. As another option, the monitor may allow a channel to override another channel to get faster buffer access. The risk of this is that it could increase the latency for other channels, causing them to over/underflow. This is a feature that the monitor would have to use with caution. Furthermore, the monitor could turn off fairness for a channel needing more buffer access. This allows the channel the opportunity to have more than one buffer access during any round robin cycle. A drawback may be that, if not compensated for, the latency would again increase for other channels. As another option, the monitor could disable a low priority channel so that it is denied buffer access completely. Another channel could then be given the disabled channel's time slice or the disabled channel's time slice could be divided up among several channels that need more buffer access. The risk here is again that the low priority channel could over/underflow its FIFO while it is disabled or it could create poor performance in the system. However, as stated above, the configurability of the invention allows the monitor to evaluate the needs for the various channels dynamically and take steps to ensure that the optimal buffer bandwidth is maintained while also meeting the latency and bandwidth requirements for the individual channels. As such, the system's performance can be optimized to use the available buffer bandwidth in the best way.

One other advantage of the invention is the ability to provide a more optimal average buffer bandwidth and latency while guaranteeing buffer bandwidth and latency to each channel. This is achieved by allowing other channels to transfer data using the memory protocol controller when an active channel's request is deasserted and either the active channel indicates that it is done or the guaranteed min slice time has been achieved, while maintaining a separate max slice counter to limit the transfer on a time-slot basis. Thus, a channel is given a guaranteed minimum amount of bandwidth via its c#_min_time setting, other channels see a guaranteed maximum amount of latency via the other channels' c#_max_slice settings, but if a channel does not need all of its min or max time, this time can be given to other channels to allow for an even better bandwidth and latency for them.

The invention can be used by any device that needs arbitrated multi-channel access to a single resource, such as a memory device, where the single resource has overhead associated with switching from one channel to another. The invention can be adjusted to handle any number of channels to this arbiter. The number of winners to queue in the SDRAM controller can be one or more. An exemplary implementation may queue up to two channels so the SDRAM controller can perform a smart bank interleaving between these channels when possible. The method used for determining priority between competing fair requests can be different. For example, the tie could be broken by a least recently used algorithm.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method of arbitrating access for a plurality of data channel inputs with different characteristics, the method comprising:

providing a plurality of data channel inputs based on a priority ordering;

setting a channel fair done bit in a channel fair done register for data channel inputs from the plurality of data channel inputs having a higher priority value than a winning data channel input, wherein the channel fair done register includes a channel fair done bit for each of the plurality of data channel inputs, and wherein a set channel fair done bit in the channel fair done register blocks an associated data channel input having a higher priority value than the winning data channel input from winning arbitration;

determining the winning data channel input from the plurality of data channel inputs using a round robin ordering based on the priority ordering in response to a fairness enable signal being asserted, wherein the winning data channel input is a highest priority channel input with a pending request having a cleared channel fair done bit in the channel fair done register so that the winning data channel input is serviced prior to data channel inputs with higher priority values having associated channel fair done bits set in the channel fair done register;

setting a minimum time counter and a maximum slice counter for the winning data channel input in response to a slot enable signal being asserted;

allowing the winning data channel input to burst data for a minimum time based on the minimum time counter and a maximum time based on the maximum slice counter, wherein the winning data channel input is allowed to continue to burst the data until its request for access deasserts even when the maximum slice counter reaches zero in response to the maximum slice counter being assigned a maximum value;

bumping an active data channel input that won arbitration to form a bumped data channel input in response to a requesting data channel input asserting an override priority signal for immediate access even when the requesting data channel input asserting the override priority signal has its associated channel fair done bit set in the channel fair done register, wherein the channel fair done bit associated with the bumped data channel input that lost a time slice in a current round robin ordering is cleared in the channel fair done register so that the bumped data channel input gets another time slice in the current round robin ordering; and causing the minimum time counter to expire in response to a done indication from the winning data channel input.

2. The method of claim 1, wherein the minimum time counter is specified as a number of clock cycles.

3. The method of claim 1, wherein the maximum slice counter is specified as one of a number of clock cycles and a number of data elements.

4. The method of claim 1, further comprising:

determining the winning data channel input based on the priority ordering, ignoring the round robin ordering, in response to a fairness enable signal being deasserted for one or more data channel inputs.

5. The method of claim 1, wherein setting a minimum time counter and a maximum slice counter for the winning data channel includes:

providing a minimum time counter value from a register logic unit to a minimum time counter logic unit; and providing a maximum slice counter value from the register logic unit to a maximum slice counter logic unit.

6. The method of claim 1, further comprising:

allowing the winning data channel to burst data indefinitely responsive to the slot enable signal being deasserted.

7. An arbiter comprising:

a plurality of data channel inputs with different characteristics;

a fairness logic unit, wherein the fairness logic unit creates a round robin ordering of the plurality of data channel inputs when enabled;

a priority logic unit, wherein the priority logic unit creates a priority ordering of the plurality of data channel inputs;

a minimum time counter that specifies a minimum time that is guaranteed for a burst for a given one of the plurality of data channel inputs;

a done indication from each of the plurality of data channel inputs to cause the minimum time counter to expire;

a maximum slice counter that specifies a maximum time that is allowed for a burst for a given one of the plurality of data channel inputs when other requests are pending, wherein the burst for the given one of the plurality of data channel inputs is allowed to continue until its request for access deasserts even when the maximum slice counter reaches zero in response to the maximum slice counter being assigned a maximum value;

a slice logic unit that manages latency and bandwidth to a winning data channel input using the minimum time counter and the maximum slice counter;

a channel fair done register that includes channel fair done bits for each of the plurality of data channel inputs, wherein a channel fair done bit is set in the channel fair done register for data channel inputs from the plurality of data channel inputs having a higher priority value than the winning data channel input, and wherein a set channel fair done bit in the channel fair done register blocks an associated data channel input having a higher priority value than the winning data channel input from winning arbitration;

a decision logic unit that determines the winning channel input from a plurality of requesting channel inputs, wherein the winning channel input is a highest priority channel input with a pending request having a cleared channel fair done bit in the channel fair done register so that the winning channel input is serviced prior to channel inputs with higher priority values having associated channel fair done bits set in the channel fair done register, and wherein the winning channel input is determined based on the fairness logic unit and the priority logic unit: and an override logic unit that allows a requesting data channel input to ignore the fairness logic unit by bumping an active data channel input that won arbitration to form a bumped data channel input in response to the requesting data channel input asserting an override priority signal for immediate access even when the requesting data channel input asserting the override priority signal has its associated channel fair done bit set in the channel fair done register, wherein the channel fair done bit associated with the bumped data channel input that lost a time slice in a current round robin ordering is cleared in the channel fair done register so that the bumped data channel input gets another time slice in the current round robin ordering.

8. The arbiter of claim 7, further comprising:

an override logic unit that allows for first tier channels and second tier channels to be specified, wherein the first tier channels work on a priority-only based arbitration and second tier channels work on a time slice round robin based arbitration.

9. The arbiter of claim 8, wherein a second tier channel is bumped in favor of a first tier channel when the minimum time counter for the second tier channel expires.

10. The arbiter of claim 9, wherein the fairness logic unit gives the second tier channel its fairness.

11. The arbiter of claim 7, further comprising:
a memory protocol controller that receives an early indication of where a new bank/row will be and generates feedback on when it will be most efficient to stop a current burst to allow a new burst to start.

12. The arbiter of claim 7, further comprising a control for tuning arbiter parameters dynamically based on feedback from a monitor logic unit.

13. The arbiter of claim 7, wherein assigning the maximum slice counter a value of zero indicates that a given channel is disabled.

* * * * *